US009117561B2

(12) United States Patent
Allberg

(10) Patent No.: US 9,117,561 B2
(45) Date of Patent: Aug. 25, 2015

(54) UNIVERSAL MOUNTING SYSTEM FOR CALIBRATION SOURCE FOR USE IN PET SCANNERS

(75) Inventor: Keith C. Allberg, Weare, NH (US)

(73) Assignee: RadQual, LLC, Pepper Pike, OH (US)

( * ) Notice: Subject to any disclaimer, the term of this patent is extended or adjusted under 35 U.S.C. 154(b) by 404 days.

(21) Appl. No.: 13/608,117

(22) Filed: Sep. 10, 2012

(65) Prior Publication Data

US 2013/0075599 A1 Mar. 28, 2013

Related U.S. Application Data

(60) Provisional application No. 61/539,631, filed on Sep. 27, 2011.

(51) Int. Cl.
*G01D 18/00* (2006.01)
*G21G 4/08* (2006.01)

(52) U.S. Cl.
CPC ............. *G21G 4/08* (2013.01); *Y10T 29/49826* (2015.01)

(58) Field of Classification Search
CPC ........................................................ G21G 4/08
USPC ................. 250/252.1, 363.01, 363.02, 363.4, 250/363.09, 370.08; 378/193–208
See application file for complete search history.

(56) References Cited

U.S. PATENT DOCUMENTS

| | | | | |
|---|---|---|---|---|
| 5,385,324 | A * | 1/1995 | Pryor et al. | 248/228.3 |
| 6,635,893 | B2 * | 10/2003 | O'Kane et al. | 250/506.1 |
| 7,147,373 | B2 * | 12/2006 | Cho et al. | 378/207 |
| 7,615,740 | B2 | 11/2009 | Allberg | |
| 7,621,703 | B2 * | 11/2009 | Keightley | 408/204 |
| 7,775,715 | B2 * | 8/2010 | Warner et al. | 378/207 |
| 7,825,372 | B2 | 11/2010 | Allberg | |
| 7,899,155 | B2 * | 3/2011 | Fadler | 378/65 |
| 7,980,521 | B2 * | 7/2011 | Harr et al. | 248/229.1 |
| 8,777,485 | B2 * | 7/2014 | Holt | 378/207 |
| 2002/0060300 | A1 * | 5/2002 | O'kane et al. | 250/515.1 |
| 2007/0235641 | A1 * | 10/2007 | Allberg | 250/252.1 |
| 2007/0260477 | A1 * | 11/2007 | Allberg | 705/1 |
| 2014/0063734 | A1 * | 3/2014 | Appleton | 361/679.55 |
| 2014/0262012 | A1 * | 9/2014 | Martenson et al. | 156/277 |

* cited by examiner

*Primary Examiner* — Kiho Kim
(74) *Attorney, Agent, or Firm* — Fay Sharpe LLP

(57) ABSTRACT

A universal mounting adapter is configured for interchangeably mounting a calibration source to two or more different imaging devices. The two imaging devices have different mounting brackets so they cannot be used with the same conventional calibration source. The present adapter includes mounting mechanisms for both types of bracket, allowing the attached calibration source to be moved from one imaging device to the other, while maintaining the calibration source in a prescribed geometry within the respective imaging device. This can be performed without the need for any tools.

22 Claims, 7 Drawing Sheets

UNIVERSAL MOUNTING SYSTEM FOR CALIBRATION SOURCE FOR USE IN PET SCANNERS

This application claims the benefit of U.S. Application Ser. No. 61/539,631, filed Sep. 27, 2011, the disclosure of which is incorporated herein by reference in its entirety.

BACKGROUND

Positron Emission Tomography (PET) devices employ positron-emitting radionuclides which are typically introduced into a subject, such as a patient, in a pharmaceutical composition. The positrons emitted by the positron-emitting radionuclides collide with the subject under investigation, resulting in the emission of pairs of gamma rays, which are detected. PET imaging devices are widely used to diagnose cancer recurrences, metastases of cancer, whether an early stage of cancer is present or not, and, if cancer has spread, its response to treatment. PET is also used in diagnosing certain cardiovascular and neurological diseases by highlighting areas with increased, diminished, or no metabolic activity.

Short-lived PET radionuclides suitable for use in PET devices include positron emitters having a half-life which is typically less than 5 days, and generally less than one day, such as Fluorine (F-18) (half-life 110 minutes), Carbon 11 (C-11) (half-life 20 minutes), Nitrogen 13 (N-13) (half-life 10 minutes), Oxygen-15 (O-15) (half-life 2 minutes), Iodine 124 (I-124) (half-life 4.2 days), Rubidium 82 (Rb-82) (half-life 75 seconds), Copper 64 (Cu-64) (half-life about 0.5 days), in quantities that are appropriate or required for dosing. Because of the short half-life of these radionuclides, they are unsuited to use in a calibration source for calibrating the PET device. Accordingly, PET calibration sources have been developed which include radionuclides which have a much longer half-life than the short-lived radionuclide used in imaging. These include radionuclides such as Germanium 68 (Ge-68) (half-life about 271 days) and Sodium 22 (Na-22) (half-life about 2.6 years). Methods have been developed to calibrate these long-lived radionuclides against the short-lived radionuclide. See, for example, U.S. Pat. No. 7,825,372 entitled SIMULATED DOSE CALIBRATOR SOURCE STANDARD FOR POSITRON EMISSION TOMOGRAPHY RADIONUCLIDES, and U.S. Pat. No. 7,615,740, issued Nov. 10, 2009, entitled SYRINGE-SHAPED DOSE CALIBRATION SOURCE STANDARD, both by Keith C. Allberg, the disclosures of which are incorporated herein by reference in their entireties.

One problem with the use of such calibration sources is that PET devices differ by manufacturer and facilities such as hospitals, often have two or more different PET devices. Thus a single calibration source often cannot be used to calibrate the different PET devices. A facility thus often has keep two or more different calibration sources in stock. Additionally, it is difficult to compare the results of two different PET devices, since this would require cross calibrating the two calibration sources at the same time.

There remains a need for a system and method for enabling a calibration source to be used interchangeably in two or more PET devices.

BRIEF DESCRIPTION

Aspects disclosed relate to a universal mounting adapter, an assembly including the adapter, a method of making the adapter and assembly, a calibrated source that can be used on the different PET devices and a method of use of the assembly. The adapter is configured for removable interconnection with two imaging devices allowing both to be calibrated with the same calibration source in the prescribed geometry where the two imaging devices are incompatible in terms of their ability to mount a conventional calibration source.

In accordance with one aspect of the exemplary embodiment, an assembly includes a calibration source which includes a radionuclide; and an adapter connected to the calibration source. The adapter includes a first mounting mechanism adapted for mounting the adapter to a first mounting bracket of a first imaging device whereby the calibration source is positioned for calibrating the first imaging device. The adapter also includes a second mounting mechanism adapted for mounting the adapter to a second mounting bracket of a second imaging device, the second mounting bracket being different from the first mounting bracket, whereby the calibration source is positioned for calibrating the second imaging device.

In accordance with another aspect of the exemplary embodiment, a universal mounting adapter is provided for mounting an associated calibration source in associated first and second imaging devices. The adapter includes a plate including first and second opposed planar surfaces and a peripheral surface which connects the planar surfaces. A threaded shaft extends from a center of the first surface of the plate. Two studs extend from the second surface of the plate. An arcuate slot is defined in the peripheral surface which extends around at least a portion of the peripheral surface.

In accordance with another aspect of the exemplary embodiment, a method for calibrating two imaging devices is provided. The first imaging device includes a first mounting bracket and the second imaging device including a second mounting bracket different from the first mounting bracket. The method includes providing a calibration source which includes a radionuclide and mounting an adapter to the calibration source. The adapter includes a first mounting mechanism adapted for mounting the adapter to the first mounting bracket and a second mounting mechanism adapted for mounting the adapter to the second mounting bracket. The method further includes mounting the adapter to the first mounting bracket of the first imaging device using the first mounting mechanism but not the second mounting mechanism, whereby the calibration source is positioned for calibrating the first imaging device and, thereafter, mounting the adapter to the second mounting bracket of the second imaging device using the second mounting mechanism but not the first mounting mechanism, whereby the calibration source is positioned for calibrating the second imaging device.

In accordance with another aspect of the exemplary embodiment, a method of making an assembly for calibrating two imaging devices is provided. The first imaging device includes a first mounting bracket and the second imaging device includes a second mounting bracket different from the first mounting bracket. The method includes providing a calibration source which includes a container which holds a radionuclide, the container including a threaded bore in an end wall and mounting an adapter to the calibration source, the adapter comprising a first mounting mechanism adapted for mounting the adapter to the first mounting bracket and a second mounting mechanism adapted for mounting the adapter to the second mounting bracket and a threaded shaft which is received within the threaded bore.

DETAILED DESCRIPTION

Figure 1:
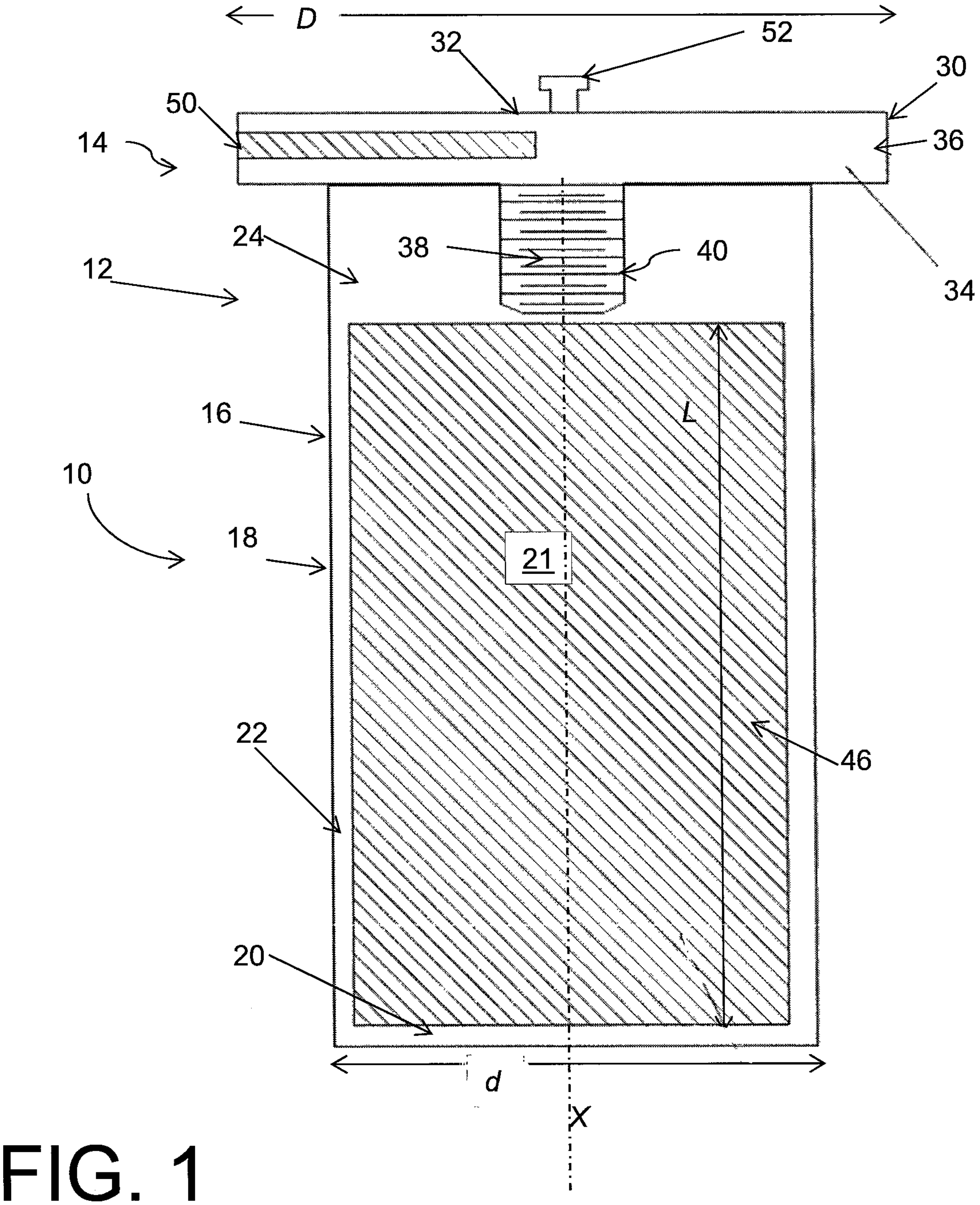
FIG. 1 is a side sectional view of an exemplary assembly in accordance with one aspect.

With reference to FIG. 1, an assembly 10 comprising a calibration source 12 and a universal mounting adapter 14 adapted for selectively mounting the calibration source 12 to a mounting bracket of an imaging device according to the exemplary embodiment is illustrated. The calibration source 12 is designed to provide a calibrated radiation dose when positioned in the imaging device. The exemplary imaging device is one which detects positrons, such as a PET imaging device or a device which combines PET with one or more other imaging methods, such as PET/CT or the like. In the case of PET imaging, the calibration source 12 may contain a calibrated quantity of Na-22 or Ge-68/Ga-68 with a determined/determinable F-18 equivalent value.

The calibration source 12 (FIG. 2) includes a container 16 which includes a cylindrical barrel 18 and a closure member 20 mounted to a first end of the barrel, which seals a radioactive dose 21 within container 16. The barrel 18 includes a cylindrical side wall 22 of substantially uniform cross section which is closed at a second end by an end wall 24. The end wall 24 may be integrally formed with the side wall 22, for example by machining from a single piece of plastic, molding or otherwise fabricating from a single piece. The container may be formed from a rigid plastic, such as high density polyethylene (HDPE). The closure 20 may be attached to the barrel by screws 28 (FIG. 2) and/or a sealant, or other fastener member(s). Screws 28 can be formed of nylon, for example.

Figure 3:
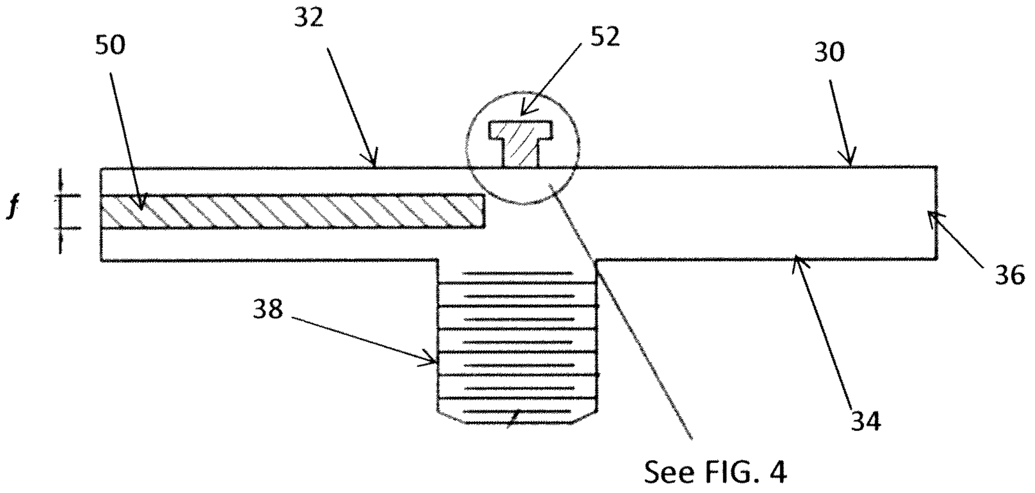
FIG. 3 is a side sectional view of one embodiment of a mounting adapter of the assembly of FIG. 1.

The mounting adapter 14 (FIGS. 3-5) includes a generally circular plate 30 with first and second opposed planar surfaces 32, 34 spaced by a peripheral surface 36. An externally threaded shaft 38 extends from the plate 30 in a direction perpendicular to the planar surface 34. The plate and threaded shaft may be integrally formed e.g., by machining them from a single piece, molding, or the like. The adapter 14 may be formed, for example from aluminum (e.g., at least 50% by weight aluminum, or at least 70 wt. % or at least 90 wt. %, or about 95 wt. % aluminum), such as an aluminum alloy, or other metal or other material which is rigid and ideally resistant to wear and corrosion. The material used for forming the adapter may have a yield strength of at least 140 MPa, e.g., at least 200 MPa, a tensile strength of at least 200 MPa, e.g., at least 250 MPa, and an elongation at break of less than 10%. As an example, a precipitation hardening aluminum alloy, containing magnesium and silicon as its major alloying elements can be used, such as a 6061 alloy, e.g., a tempered alloy, such 6061-T6 aluminum alloy (solutionized and artificially aged) is used.

Figure 2:
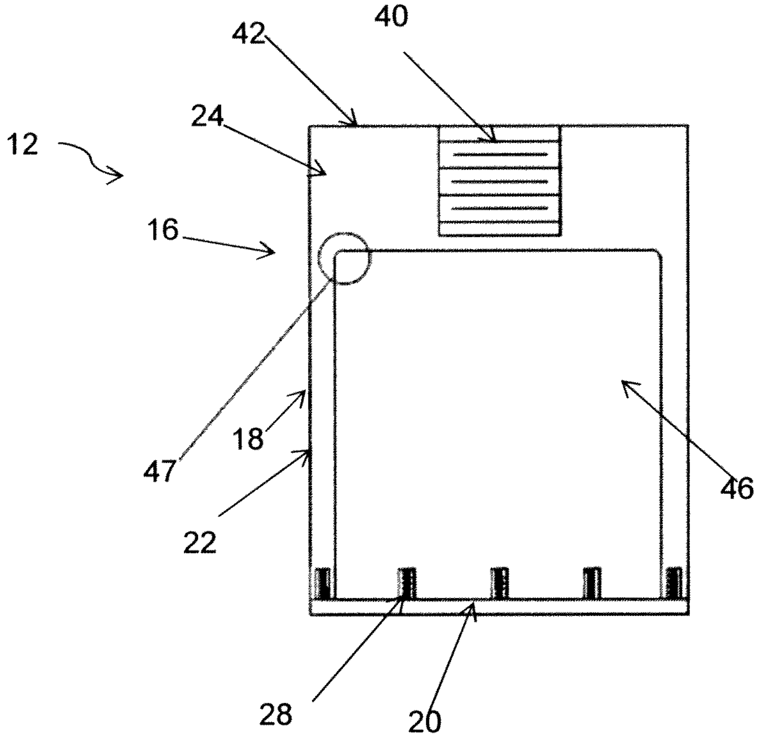
FIG. 2 is a side sectional view of a calibration source of the assembly of FIG. 1.

As shown in FIG. 2, the container end wall 24 is of sufficient thickness to accommodate a threaded bore 40 adapted for threadably receiving and engaging the threaded shaft 38 of the mounting adapter 14. Both the bore 40 and the threaded shaft 38 may be double or triple threaded with complementary threads for creating a rigid engagement with virtually no play. A planar exterior surface 42 of the end wall 24 contacts the surface 34 of the plate when the threaded shaft and bore are fully engaged.

The container 16 defines a cylindrically-shaped interior cavity 46 which holds the radioactive source-containing material 21, sealed within the barrel 18 by the planar closure member 20. The exemplary radioactive source-containing material 21 may include one or more radionuclides encapsulated in a suitable solid matrix material. Exemplary nuclides include gamma radiation emitters, such as germanium 68 (Ge-68) or sodium 22 (Na-22), in appropriate quantities for serving as a traceable calibration source that acts as a proxy for F18. The matrix material may comprise an epoxy, silicone, urethane, ceramic, or similar type of matrix material in which the radionuclide may be uniformly dispersed to form a solid mixture. For example, the calibration source 12 may include radioactive material having an activity of from 0.1-20 millicuries (mCi). While FIG. 1 shows the interior being entirely filled with radioactive source-containing material 21, there may be an air space between the material and the closure 20.

The exemplary plate 30 has a diameter D which is greater than a diameter d of the container 12, such that the plate overhangs the container, as seen in FIG. 1. The barrel 18 has an interior length L which sufficient to present a suitable length of radioactive material 21 to the imaging device for positrons emitted when the gamma radiation collides with container to be detected by the detectors of the imaging device. The exact length may be dependent on the type of imaging devices in which it is to be used, e.g., whether the imaging devices are one, two, or three ring devices. L may be, for example, from about 2-100 cm, such as about 20-40 cm. In one embodiment, the outer barrel diameter d may be about 2-50 cm e.g., about 6-20 cm, and plate diameter D about 0.5-10 cm greater than d, e.g., the barrel diameter d may be about 20 cm and the plate diameter D may be about 25 cm in diameter. The volume of the interior cavity 46 may be from about 3 to about 20,000 $cm^3$, such as at least about 500 $cm^3$, e.g., about 7000 $cm^3$.

Figure 4:
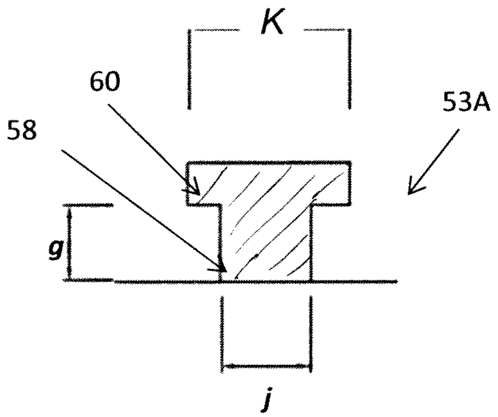
FIG. 4 is an enlarged view of the stud of FIG. 3.
Figure 5:
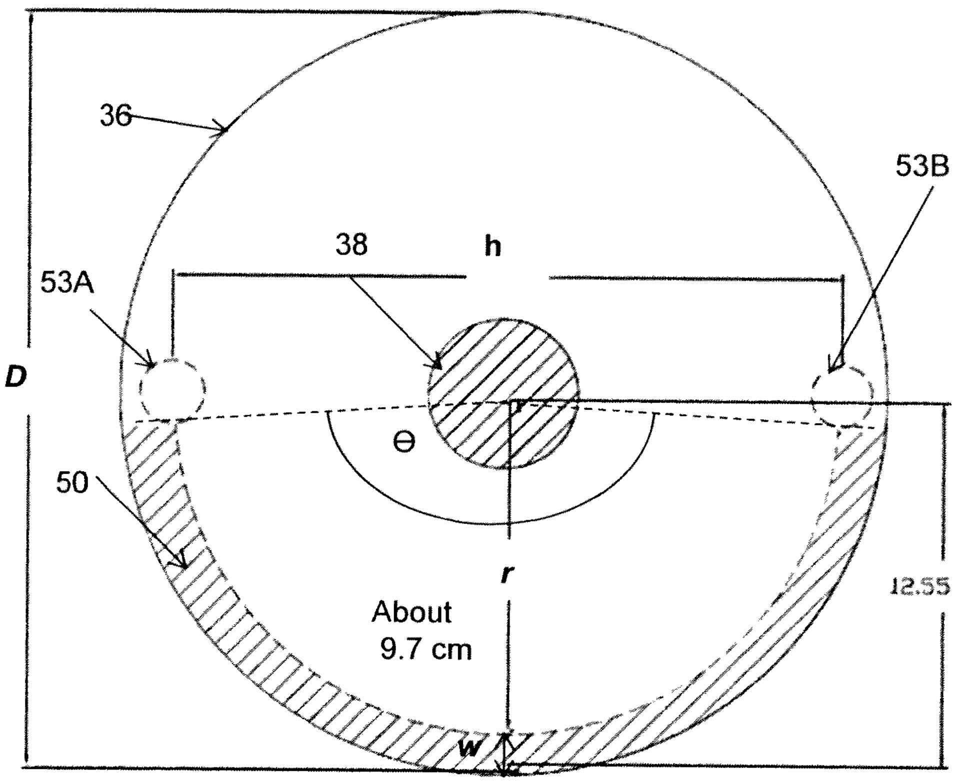
FIG. 5 is a top view of the mounting adapter of FIG. 3.

Referring once more to FIGS. 3 and 4, the mounting adapter 14 provides plural types of mounting mechanisms 50, 52 for selectively mounting the adapter 14, and hence the calibration source 12, to suitably configured brackets of different imaging devices. In particular, a first mounting mechanism 50 is in the form of a single groove or slot which extends, from the peripheral surface 36, into the plate 30. The slot 50 extends parallel to and intermediate the surfaces 32, 34. As best seen in FIG. 5, the slot 50 is arcuate, e.g. annular in shape. The exemplary slot has an inner radius r of about 8-10 cm, e.g., r=d/2 and a uniform, radial width w (extending from the peripheral surface 36 of the plate 30 to the inner radius r) which may be less than ¼D, such as about 1-5 cm, e.g., 2-4 cm. The slot 50 extends at least partially around the circumference of the plate 30, to subtend an angle $\ominus$ of at least 45 degrees or at least 90 degrees or at least 120 degrees, or at least 160 degrees, e.g., about half way round the plate (e.g., $\ominus$=160-190°, or $\ominus$<180°).

Figure 6:
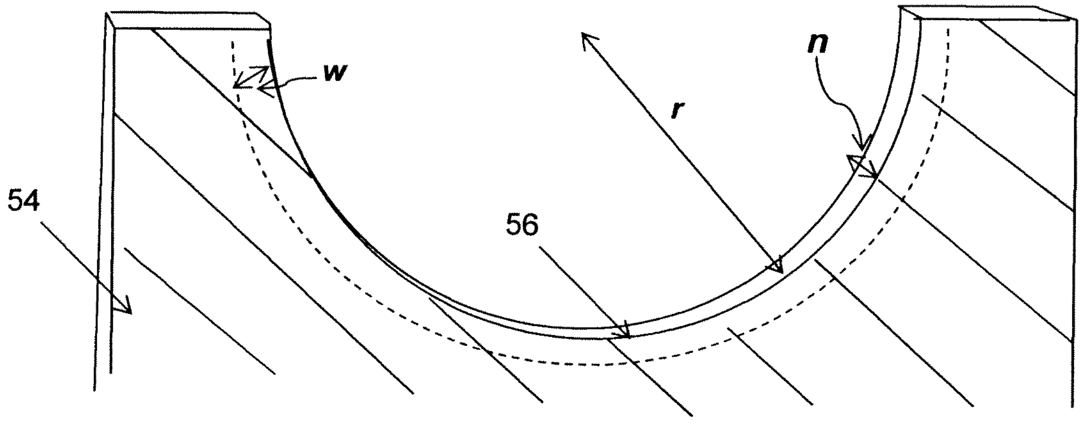
FIG. 6 illustrates a bracket of an imaging device ready to receive the mounting adapter of FIG. 5.
Figure 9:
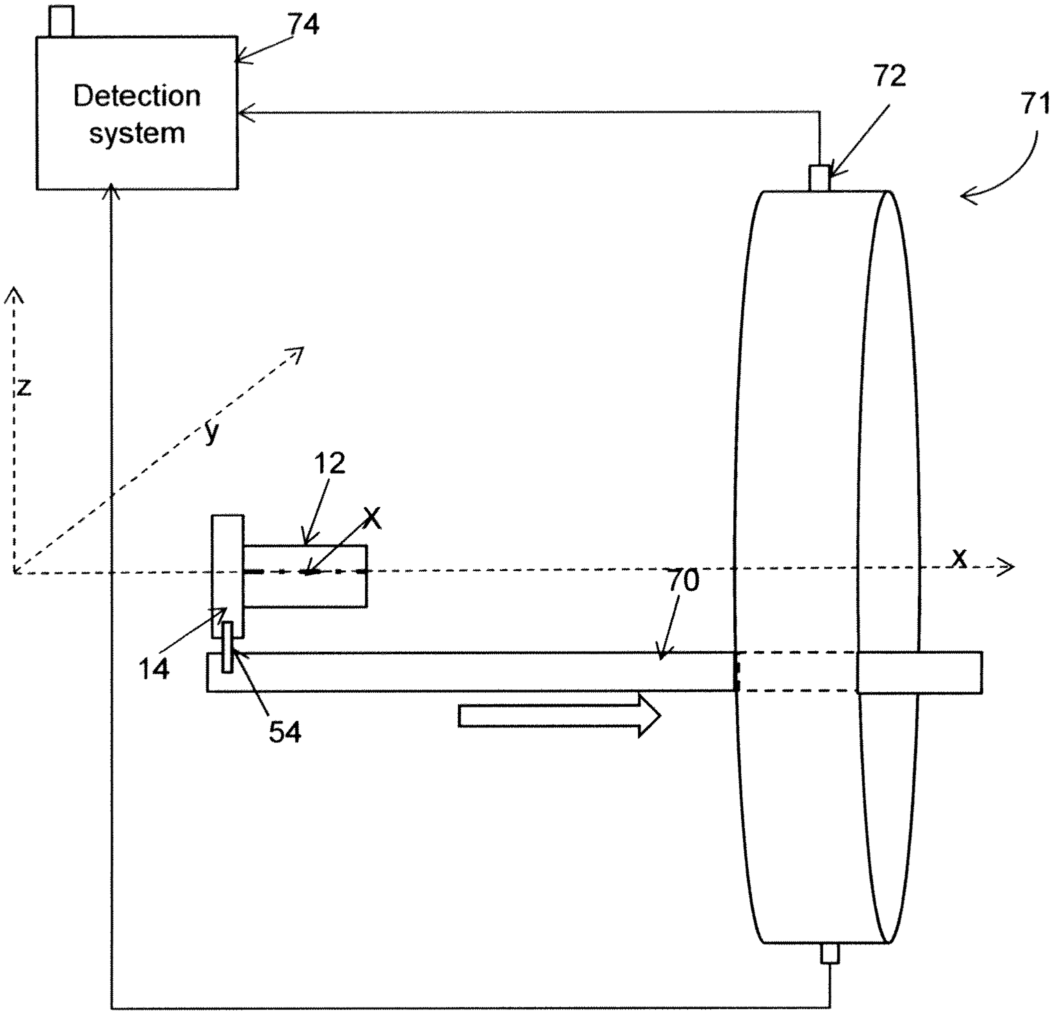
FIG. 9 is a perspective view of a second imaging device bracket.

The slot has a depth f (perpendicular to the surfaces of the plate) of about 0.5 to 1 cm (FIG. 3) which is sized to receive a portion of a bracket 54 of the imaging device therein (FIG. 6). In particular, the bracket is in the shape of a rectangular plate with an arcuate (e.g., semi-circular) cut out 56 of approximately the same radius r as the slot's inner radius. In this way, the mounting adapter can be slotted into the slot, holding the assembly 10 rigidly positioned with respect to x, y and z axes (FIG. 9). The bracket has a width n which is only slightly less than the width f of the arcuate slot 50, so that it is received within the slot 50 up to a depth of about w, and firmly gripped by the side walls of the slot. The bracket 54 is thus designed to position a longitudinal axis X of the calibration source 12 along the central axis x of the imaging device, i.e., in the prescribed geometry for the calibration source 12 to calibrate the imaging device. It is not necessary to prevent rotation of the assembly about the x axis since the barrel is symmetrical about the X axis. As will be appreciated, although not shown, the bracket 54 may include additional members, e.g., one in contact with each of surfaces 32 and 34 of the plate, to provide additional support for the assembly. Engagement of the adapter with the bracket 54 in the prescribed geometry, and subsequent disengagement from the bracket, can be performed entirely without tools, i.e., by hand.

Figure 7:
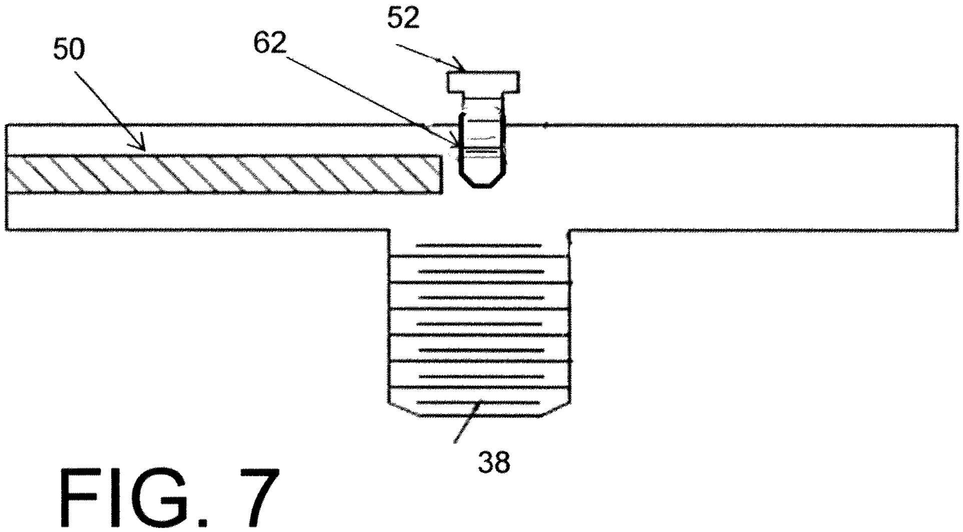
FIG. 7 is a side sectional view of another embodiment of a mounting adapter of the assembly of FIG. 1.
Figure 8:
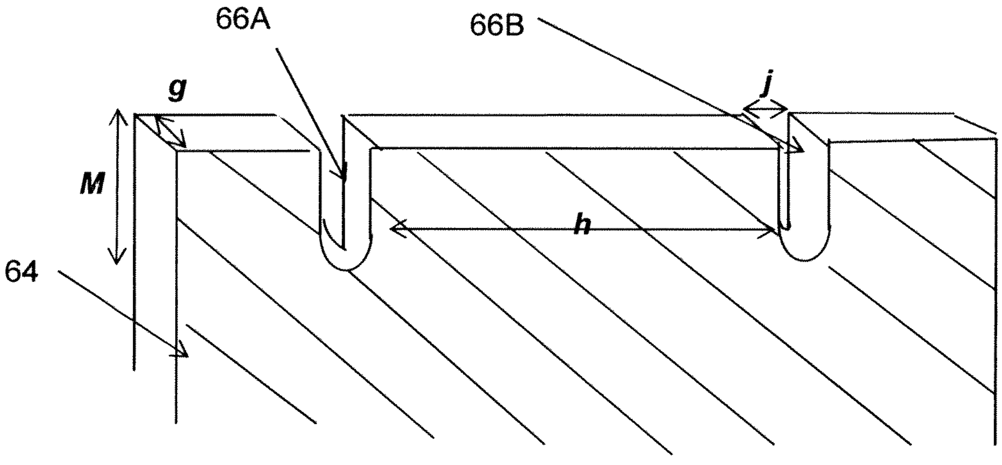
FIG. 8 is a schematic view of the assembly in use in a first imaging device.
Figure 10:
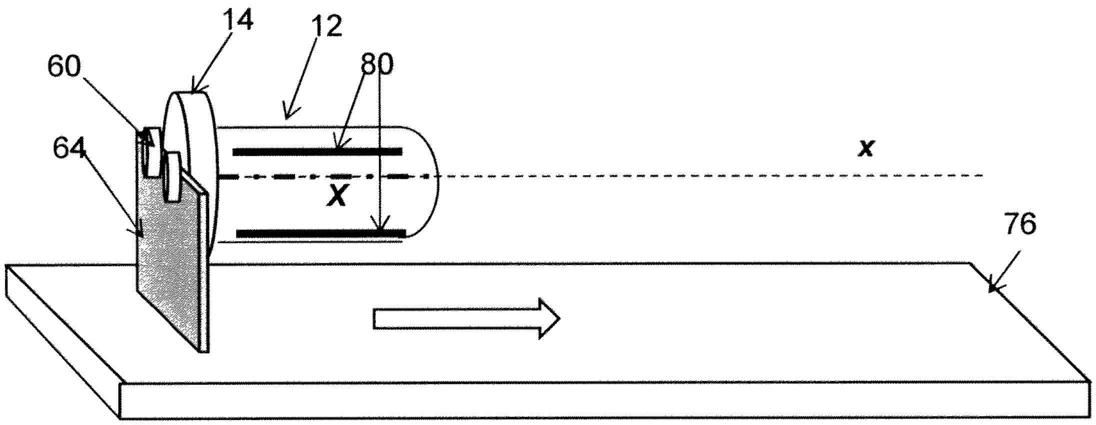
FIG. 10 is a schematic view of the assembly in use in a second imaging device.

As shown in FIG. 5, the second mounting mechanism 52 includes a pair of studs 53A, 53B which extend from the surface 32 of the plate. The studs each include a generally cylindrical shank 58, of length g and diameter j, and an enlarged head 60 at a terminal end of the shank (FIG. 4). The head has a diameter k, where k>j. The studs 53A, 53B may be integrally formed with the plate 30 to provide a shank with a fixed length. Alternatively, the studs may be fitted with a threaded end 62 (FIG. 7) for fastening the stud to the plate and optionally for variably adjusting the exposed length g of the shank 58. The studs 53A, 53B are equidistant from the shaft 38 and may be spaced apart by a distance h (FIG. 5) of approximately 2×r such that the center of the studs lie on the same radius as an inner end of the slot. In one embodiment, the centers of the studs 53A, 53B and the shaft 38 are collinear. The studs 53A, 53B are configured for mounting the assembly 10 to a second mounting bracket 64 which includes a pair of slots 66A, 66B of uniform width, defined in an upper end thereof (FIG. 8). The bracket slots 66A, 66B are spaced from each other by a distance h to receive a respective stud shank 58 therein. The slots 66A, 66B are open at each side of the bracket 64 to allow the studs 53A, 53B to extend therethrough. As will be appreciated, while two slots 66A, 66B and two studs 53A, 53B are shown, more than two of each could be employed. The bracket 64 can be in the form of a rectangular or otherwise shaped plate with a thickness that is the same as the shaft length g so that the head of the stud and surface 32 of the circular plate grip either side of the bracket 64 tightly when the assembly 10 has been slid into place (FIG. 10). The slots in the bracket have a length M which is selected to position the longitudinal axis X of the source along the central axis x of the imaging device (FIG. 10), i.e., in the prescribed geometry for the imaging device. Engagement of the adapter with the bracket 64 in the prescribed geometry, and subsequent disengagement from the bracket, can be performed entirely without tools, i.e., by hand.

As shown in FIG. 9, the first bracket 54 is mounted to a patient table 70 of a first imaging device 71. The table is designed to support a subject, such as a person or animal, during an imaging procedure. The patient table 70 moves in the x direction through a ring of detectors 72 arranged in pairs offset by 180° (only two are shown for ease of illustration). The detectors generate electrical signals in response to the detection of positrons, which are processed by a detection system 74 to generate a PET image of the subject, who has been dosed with a short lived radionuclide, such as F18. During calibration, the detectors 72 provide calibration signals, in response to detection of positrons emitted from the calibration source 12, which are used by the detection system 74 to provide a calibration for the short-lived radionuclide-based signals.

As will be appreciated, the second bracket 64 is similarly rigidly mounted to a second patient table 76 (FIG. 10) of another imaging device with a ring of detectors and a detection system (not shown), which can be configured similarly to that shown in FIG. 9. The mounting mechanisms 50, 52 are arranged on the plate 30 so that irrespective of which of the two imaging devices the assembly is used in, the calibration source 12 is properly aligned with the respective ring of detectors. This allows the two imaging devices to be calibrated with the same calibration source, by moving the assembly 10 from one imaging device to the other. This allows reproducibility in calibration of the two devices and allows imaging results output by the two devices to be compared with greater accuracy.

The calibration source 12 may be marked with suitable markings 80 on the barrel which allow its position to be detected, e.g., with a laser, and any errors in its position corrected by adjustments to the respective mounting bracket 54 or 64.

To form the assembly 10, a container 16 is formed by machining one end of a cylindrical a solid block of plastic to define the interior cavity 46 and machining the other end to define the threaded bore 40. Appropriate quantities of a radionuclide (e.g., Ge 68) in liquid form and a liquid polymer composition are mixed to disperse the radionuclide uniformly in the polymer (having saved some of the radionuclide liquid or liquid mixture for testing to be calibrated e.g., against a traceable National Institute of Standards (NIST) solution of F18, as described, for example, in above-mentioned U.S. Pat. No. 7,825,372). The polymer composition may include a polymer resin together with accelerators, crosslinking agents, and the like which cause the polymer to harden when cured (e.g., by UV-curing or an ambient cure). The liquid radionuclide/polymer composition is placed in the barrel 18 and cured to form a solid 21. The barrel is then sealed to the closure member 20, for example, by placing a small amount of the polymer matrix material around the end of the barrel and then screwing the screws 28 into the barrel. A custom decay calendar may then be derived and a label affixed to the calibration source or to a shielding container in which the source 12 is shipped and stored. The exemplary label also carries the conversion factor(s) for one or more PET radionuclides, such as F18.

The completed cylinder source 12 can then be stored and/or shipped, e.g., in a radiation shielded case. The adapter 14 can be affixed to the cylinder source 12 at any suitable time, and optionally removed therefrom after use. To cross calibrate two imaging devices, the assembly 10 is mounted to a first of the imaging device brackets (e.g., bracket 54) and the table advanced through the ring of detectors while signals generated thereby are received at the detection system 74 and processed. The assembly is removed from the first mounting bracket and mounted to the second mounting bracket 64 and the calibration process is repeated. By comparing the results of the two scans, any differences between the two imaging devices can be minimized by modifying the algorithm which converts the signals received from imaging a subject to a resulting image.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

I claim:

1. An assembly comprising:

a calibration source which includes a radionuclide; and an adapter connected to the calibration source, the adapter comprising:

a first mounting mechanism adapted for mounting the adapter to a first mounting bracket of a first imaging device whereby the calibration source is positioned for calibrating the first imaging device; and a second mounting mechanism adapted for mounting the adapter to a second mounting bracket of a second imaging device, the second mounting bracket being different from the first mounting bracket, whereby the calibration source is positioned for calibrating the second imaging device.

2. The assembly of claim 1, wherein the first mounting mechanism comprises a slot.

3. The assembly of claim 2, wherein the adapter comprises a circular plate and the slot is defined in a peripheral surface of the plate.

4. The assembly of claim 2, wherein the slot defines an arc of a circle.

5. The assembly of claim 1, wherein the second mounting mechanism comprises a stud.

6. The assembly of claim 5, wherein the second mounting mechanism comprises a plurality of studs.

7. The assembly of claim 6, wherein the adapter comprises a circular plate and the studs extend from a planar first surface of the plate.

8. The assembly of claim 1, wherein the adapter comprises a plate with a threaded shaft extending therefrom and the calibration source includes a bore with threads complementary to the shaft for threadably connecting the calibration source to the adapter.

9. The assembly of claim 8, wherein the plate includes the first and second mounting mechanisms.

10. The assembly of claim 9, wherein the first mounting mechanism includes an arcuate slot which extends at least partially around a periphery of the plate.

11. The assembly of claim 10, wherein the arcuate slot which extends around a periphery of the plate to subtend an angle of at least 45°, or at least 90°, or at least 120° or at least 160°.

12. The assembly of claim 8, wherein the plate is circular.

13. The assembly of claim 1, wherein adapter includes a plate including first and second opposed planar surfaces and a peripheral surface which connects the planar surfaces, a threaded shaft extending from a center of the first surface of the plate which threadably connects the adapter to the calibration source;

the first connection mechanism includes two studs extending from the second surface of the plate; and the second connection member includes an arcuate slot defined in the peripheral surface which extends around at least a portion of the peripheral surface.

14. The assembly of claim 1, wherein the first mounting mechanism adapted for mounting the adapter to the first type of mounting bracket is not configured for mounting the calibration source in the second imaging device for positioning the calibration source for calibrating the second imaging device and the second mounting mechanism adapted for mounting the adapter to the second type of mounting bracket is not configured for mounting the calibration source in the first imaging device for positioning the calibration source for calibrating the first imaging device.

15. The assembly of claim 1, wherein the radionuclide includes germanium 68 or sodium 22 with a fluorine 18 equivalent value.

16. A universal mounting adapter for mounting an associated calibration source in associated first and second imaging devices, comprising:

a plate including first and second opposed planar surfaces and a peripheral surface which connects the planar surfaces;

a threaded shaft extending from a center of the first surface of the plate;

two studs extending from the second surface of the plate; and an arcuate slot defined in the peripheral surface which extends around at least a portion of the peripheral surface, the arcuate slot having an inner radius spaced from the peripheral surface by a uniform, radial width, centers of the studs lying on the inner radius.

17. An assembly comprising a universal mounting adapter and a calibration source, the calibration source comprising a cylindrical container which holds a radionuclide, the universal mounting adapter comprising:

a plate including first and second opposed planar surfaces and a peripheral surface which connects the planar surfaces;

a threaded shaft extending from a center of the first surface of the plate;

two studs extending from the second surface of the plate; and an arcuate slot defined in the peripheral surface which extends around at least a portion of the peripheral surface, the container having an end wall which defines a threaded bore which receives the threaded shaft therein.

18. The assembly of claim 17, wherein the studs and shaft are collinear.

19. A method for calibrating two imaging devices, the first imaging device including a first mounting bracket and the second imaging device including a second mounting bracket different from the first mounting bracket, the method comprising:

providing a calibration source which includes a radionuclide;

mounting an adapter to the calibration source, the adapter comprising a first mounting mechanism adapted for mounting the adapter to the first mounting bracket and a second mounting mechanism adapted for mounting the adapter to the second mounting bracket;

mounting the adapter to the first mounting bracket of the first imaging device using the first mounting mechanism but not the second mounting mechanism, whereby the calibration source is positioned for calibrating the first imaging device;

thereafter, mounting the adapter to the second mounting bracket of the second imaging device using the second mounting mechanism but not the first mounting mechanism, whereby the calibration source is positioned for calibrating the second imaging device.

20. The method of claim 19, wherein the radionuclide comprises Ge-68 or Na-22 with an F-18 value that is traceable to the National Institute of Standards.

21. The method of claim 19, wherein the mounting the adapter to the first mounting bracket includes engaging the adapter with the first mounting bracket without the use of tools and the mounting of the adapter to the second mounting bracket includes disengaging the adapter from the first mounting bracket without the use of tools and engaging the adapter with the second mounting bracket without the use of tools.

22. A method of making an assembly for calibrating two imaging devices, the first imaging device including a first mounting bracket and the second imaging device including a second mounting bracket different from the first mounting bracket, the method comprising:

providing a calibration source which includes a container which holds a radionuclide, the container including a threaded bore in an end wall of the container; and mounting an adapter to the calibration source, the adapter comprising a first mounting mechanism adapted for mounting the adapter to the first mounting bracket and a second mounting mechanism adapted for mounting the adapter to the second mounting bracket and a threaded shaft which is received within the threaded bore.

* * * * *